(No Model.)
S. F. SHELBOURNE.
ANTI INDUCTION ELECTRIC CONDUCTOR.
No. 297,176. Patented Apr. 22, 1884.
Fig. 1.
Fig. 2.
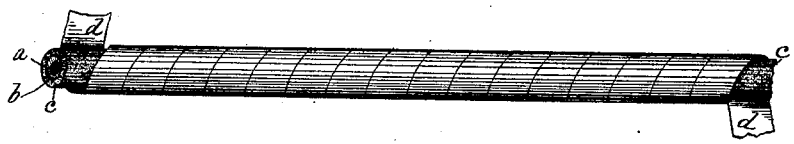
Fig. 3.
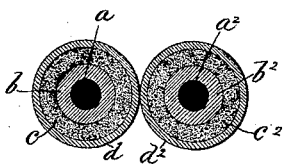
Fig. 4.
| Quinary | 16 currents |
| Quaternary | 8 currents |
| Tertiary | |
| Secondary | |
| Primary | |
Witnesses:
John Buckler,
Geo. L. Weed.
Inventor:
Sidney F. Shelbourne

UNITED STATES PATENT OFFICE.

SIDNEY F. SHELBOURNE, OF NEW YORK, N. Y.

ANTI-INDUCTION ELECTRIC CONDUCTOR.

SPECIFICATION forming part of Letters Patent No. 297,176, dated April 22, 1884.

Application filed August 18, 1883. (No model.)

*To all whom it may concern:*

Be it known that I, SIDNEY F. SHELBOURNE, a citizen of the United States, residing in the city of New York and State of New York, have invented a new and useful Improvement in Anti-Induction Electric Conductors, of which the following is a specification.

It is well known scientifically and in practice that electric currents in parallel conductors act and react upon each other by magnetic sympathy, and thus induce and reinduce currents in each other whose strength and direction depend upon the distance between the conductors themselves and the relation in series of any of the induced currents to the beginning and ending of the primary or inducing current.

Various attempts have been made to prevent induction in telephonic lines on the theory that induction was a sort of leakage escaping from one line and taken up on another parallel to it, and thus giving to the audiphone attached to the second line the same quality of modifications of current as were conditioned to actuate the diaphragm of the receiver in producing speaking tones on the inducing-line. Expensive methods have been proposed and adopted experimentally upon this theory to lead off and convey to the ground the escaping or induced currents, one of them, as shown in Patents Nos. 224,579 and 224,580, to Chinnock, dated February 17, 1880, being to incase the insulated conductors in metal strips in contact with each other throughout the group or cable and all these connected with the ground at short intervals. A modification of the strips has been to incase the insulated conductors each in a lead tube and the whole number of lead tubes in contact with each other and at convenient spaces with the ground. There is no doubt that the use of a conducting envelope or casing surrounding the insulation of the wire is a step in the direction of a true theory; but, as hitherto employed, the path to a proper method has been missed at that single fact, first, because induction is not a leaked or escaped current; second, because to place these metal coatings in contact with each other gives a conductive approach of the currents, induced in the one by the currents of its inclosed wire, to the wires inclosed in every other metal casing in the whole group or cable, and therefore a nearer inductive effect upon every wire thus inclosed in the cable; third, because to connect these coatings with the ground at frequent intervals has the effect to give the earth's reservoir of neutral electricity a free and multiplied access to the several metallic coatings in contact with each other. If a positive current is passing in the useful wire, the neutral electricity of the earth gives its negative element to supply the attraction of the positive in the wire. A negative current from the earth is therefore induced along the metal coatings of the wires, and by inductive action and reaction between the wire and the coatings the useful-wire current is greatly disturbed and modified. It is observed, also, that in such connection of the coatings with each other and frequently with the ground, these coatings become the multiplied surfaces of a great condenser, and by inductive reaction upon the useful current static charge and consequent retardation result in its conductor; fourth, another principle has been entirely disregarded—namely, that of dividing and diminishing inductive effects by an insulated division of the conductive metallic induction guards or coatings.

With reference to the several matters just mentioned, the present invention relates, first, to a new character of conducting-covering surrounding the insulation of the wire; and, secondly, to the insulation of that covering from that of every other wire in the cable or group.

In carrying out my invention the conducting-wire is covered with its insulating material, which may be of any usual character, preferably, for cheapness, of jute fiber, and saturated *in vacuo*, as described in a previous application for a patent, with the insulating compound. The insulating-wire is then passed, by means of grooved wheels or rollers and condensing-gages, through a tray or trough containing magnetic oxide of iron previously ground under burr-stones to a fine flour. After taking on a compressed coating of the oxide of iron, which may be formed into a paste for the purpose, the coated wire passes immediately into a tapeing-machine and receives an outer covering of one or more thicknesses of cloth or tape, which has been saturated with any of the known bituminous or resinous compounds for insulation.

Referring to the drawings, Figure 1 shows in full-size section a conductor thus prepared, the wire being represented by the letter $a$, its insulation by $b$, the oxide-of-iron coating by $c$, and its outer insulating-covering by $d$. In Fig. 2 is represented in perspective a short length of wire thus prepared, the tapeing $d$ being partly rolled back from the ends of the wire, showing in length the conducting-coating of oxide of iron secured beneath it. The magnetic oxide of iron as thus prepared and applied is, compared with lead, a fair conductor, and answers the purpose admirably for a double reason—it receives and gives direction to the induced current, which it also retards and subdues, and by reason of its want of homogeneity as a metal each one of its minute particles, under the magnetic influence of the inducing-wire, becomes a magnet in itself, and thus there are as many reversals of magnetic polarity from the interior outward as there are particles of the oxide in the thickness of the coating. It is well known scientifically that magnetic action is very rapidly diminished and modified under the rapid succession of additional bodies and changing polarities, as is illustrated by the attempt to lift a considerable piece of iron with a magnet whose poles have been dipped in a mass of iron filings and with those filings adhering between the magnet and the iron.

The function of the outer insulation or tapeing may be illustrated by Figs. 3 and 4, in which $a$, Fig. 3, will represent the wire carrying the telephonic current, it being observed that this current is itself a secondary current induced by the primary or battery current in connection with the transmitter. $a$, therefore, will induce, through its insulation $b$, a tertiary current in its oxide coating $c$. If, now, the coating $c$ were not insulated by $d\ d^2$ from $c^2$, and $c\ c^2$ were in metallic contact, the current in $c$ would also extend by conduction to $c^2$, and therefore affect, by a single step of induction, the wire $a^2$, but because the insulations $d\ d^2$ are interposed between $c$ and $c^2$, the currents in $c$ must proceed to $c^2$ by sympathy or induction, and therefore the currents in $c^2$ are removed to the series of quarternary. In consequence of this progression by induction instead of conduction, the currents which finally affect $a^2$ have been reduced to the quinary series, and are not only diminished in volume theoretically to one-half what they would have been had not $d$ and $d^2$ been interposed between $c$ and $c^2$; but by removal their effect has been lessened in a geometrical ratio as the square of the increased distance.

Fig. 4 will show the scale of diminution by division of currents, it being understood that as each current induces other currents, both at its beginning and ending, the new outward series of currents will therefore multiply in an arithmetical ratio at every step of progression from the primary conductor. It has only been practicable to place arrows in the figure for these currents so far as the tertiary series, the quarternary and quinary being represented, respectively, by Figs. 8 and 16.

While the black or magnetic oxide of iron is by far the best pulverulent metallic substance for the purpose of the coating $c$, as explained, by reason of its exceeding cheapness and its perpetual incapacity to take on the non-metallic qualities of the red oxide, I do not limit myself to this particular substance, since fine iron filings, if protected from rusting, will answer the purpose sufficiently, and, in fact, any paramagnetic material capable of fine division may be employed. Nor do I limit myself to the outer insulation, $d$, in connection with the pulverulent coating $c$, since this insulation will serve the same purpose and have the same effect when used with the ordinary metallic lead-covered or tin-foil-wrapped conductors as heretofore used.

What I claim as new is—

1. An insulated conductor for electric uses, combined with a conductive layer or coating of pulverized magnetic oxide of iron surrounding and inclosing its insulation as an induction-shield, substantially as described.

2. The black oxide of iron or equivalent substance, mixed with any suitable material in the form of paste, and applied as a coat or layer surrounding the insulation, covering the wire or other electric conductor, substantially as described, and for the purpose of resisting conduction and dividing induction between adjacent conductors, as herein set forth.

3. In combination with an insulated conductor covered with a metallic coating or induction-guard, an outer covering of insulation inclosing such induction-guard for the purpose of separating it conductively from the like coatings of adjacent conductors, as and for the purpose herein described.

4. The combination in series of the following elements: first, a wire or other electric conductor; second, an insulating material covering and inclosing said wire; third, an induction-shield or conductor covering and inclosing such insulating material, and composed of a metal or pulverulent paramagnetic substance; fourth, surrounding and inclosing such metal or paramagnetic substance, a coating or wrapping of insulating material, substantially as and for the purpose set forth.

SIDNEY F. SHELBOURNE.

Witnesses:
FRANK S. TYLER,
GEO. L. WEED.